(12) United States Patent
Teshome et al.

(10) Patent No.: US 10,476,858 B2
(45) Date of Patent: Nov. 12, 2019

(54) SYSTEM AND METHOD TO REMOTELY SECURE A COMPROMISED INFORMATION HANDLING SYSTEM

(71) Applicant: Dell Products L.P., Round Rock, TX (US)

(72) Inventors: Abeye Teshome, Austin, TX (US); Nicholas D. Grobelny, Austin, TX (US); Joseph Kozlowski, Jr., Hutto, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 15/589,736

(22) Filed: May 8, 2017

(65) Prior Publication Data
US 2018/0324162 A1 Nov. 8, 2018

(51) Int. Cl.
*G06F 21/45* (2013.01)
*H04L 29/06* (2006.01)
*G06F 21/55* (2013.01)

(52) U.S. Cl.
CPC ............. *H04L 63/08* (2013.01); *G06F 21/45* (2013.01); *G06F 21/554* (2013.01); *H04L 63/083* (2013.01); *H04L 63/12* (2013.01)

(58) Field of Classification Search
CPC ...................................................... H04L 63/08
USPC ............................................................ 726/7
See application file for complete search history.

(56) References Cited

U.S. PATENT DOCUMENTS

| 7,841,008 | B1* | 11/2010 | Cole | G06F 21/577 |
| | | | | 709/226 |
| 9,552,491 | B1* | 1/2017 | Giforos | G06F 21/78 |
| 2010/0107238 | A1* | 4/2010 | Stedman | G06F 21/32 |
| | | | | 726/13 |
| 2014/0012756 | A1* | 1/2014 | Beraja | G06F 19/328 |
| | | | | 705/44 |

(Continued)

OTHER PUBLICATIONS

Distributed Management Task Force, Inc., "Management Component Transport Protocol (MCTP) Base Specification." (Apr. 22, 2010); 82 pages.

(Continued)

*Primary Examiner* — Michael S McNally
*Assistant Examiner* — Kevin Ayala
(74) *Attorney, Agent, or Firm* — Baker Botts L.L.P.

(57) ABSTRACT

In one or more embodiments, one or more systems, methods, and/or processes may receive, independently of a processor of the information handling system (IHS), first credential management information and may modify, independently of the processor and based on the first credential management information, credential information stored via a secure object store of the IHS. For example, modifying the credential information may include modifying the credential information such that the IHS denies access to at least a portion of the IHS based on the credential information. In one instance, denying access to at least the portion of the IHS may include disabling at least one of password, biometric information associated with a user, and an encryption key. In another instance, denying access to at least the portion of the IHS may include remapping, independently of the processor, at least one human interface device.

15 Claims, 10 Drawing Sheets

(56) References Cited

U.S. PATENT DOCUMENTS

2017/0230336 A1* 8/2017 Bingham ............ H04L 63/0281

OTHER PUBLICATIONS

Distributed Management Task Force, Inc., "Platform Level Data Model (PLDM) Base Specification." (Apr. 23, 2009); 31 pages.
Distributed Management Task Force, Inc., "NC-SI over MCTP Binding Specification." (Mar. 21, 2015); 31 pages.
Distributed Management Task Force, Inc., "Network Controller Sideband Interface (NC-SI) Specification." (Jan. 24, 2013); 124 pages.

* cited by examiner

SYSTEM AND METHOD TO REMOTELY SECURE A COMPROMISED INFORMATION HANDLING SYSTEM

BACKGROUND

Field of the Disclosure

This disclosure relates generally to information handling systems and more particularly to remotely securing compromised information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, information handling systems have been hacked or stolen to gain access to data of the information handling systems. The data (e.g., user data, sensitive data, confidential data, corporate data, etc.) is not always encrypted. Moreover, even if encryption is utilized, sophisticated attacks can compromise the data, targeting passphrases and locally stored secure objects including encryption keys. Various data breaches are attributed to loss of portable information handling systems. With theft-related threats, an information handling system may be out of reach prior to the data being destroyed or secured, allowing virtually unlimited time to defeat any implemented security.

SUMMARY

In one or more embodiments, one or more systems, methods, and/or processes may receive, independently of a processor of the information handling system, first credential management information and may modify, independently of the processor and based on the first credential management information, credential information stored via a secure object store of the information handling system. For example, modifying the credential information may include modifying the credential information such that the information handling system denies access to at least a portion of the information handling system based on the credential information. In one instance, the credential information may include at least one of a password, biometric information associated with a user, and an encryption key. In a second instance, modifying the credential information such that the information handling system denies access to at least the portion of the information handling system based on the credential information may include disabling the at least one of the password, the biometric information associated with the user, and the encryption key. In another instance, denying access to at least the portion of the information handling system may include remapping, independently of the processor, at least one human interface device.

In one or more embodiments, one or more systems, methods, and/or processes may receive, independently of the processor, second credential management information, and may modify, independently of the processor and based on second credential management information, the credential information. For example, modifying, independently of the processor and based on the second credential management information, may enable access to at least the portion of the information handling system based on the credential information. For instance, modifying the credential information such that access to at least the portion of the information handling system is enabled may include modifying the at least one of the password, the biometric information associated with the user, and the encryption key.

In one or more embodiments, one or more systems, methods, and/or processes may receive, independently of the processor and via a network interface, first authentication information and second authentication information via a user interface of the information handling. For example, it may be determined that the first authentication information and the second authentication information match, and access to at least the portion of the information handling system may be enabled. For instance, enabling access to at least the portion of the information handling system may include modifying the at least one of the password, the biometric information associated with the user, and the encryption key based on the second credential information.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
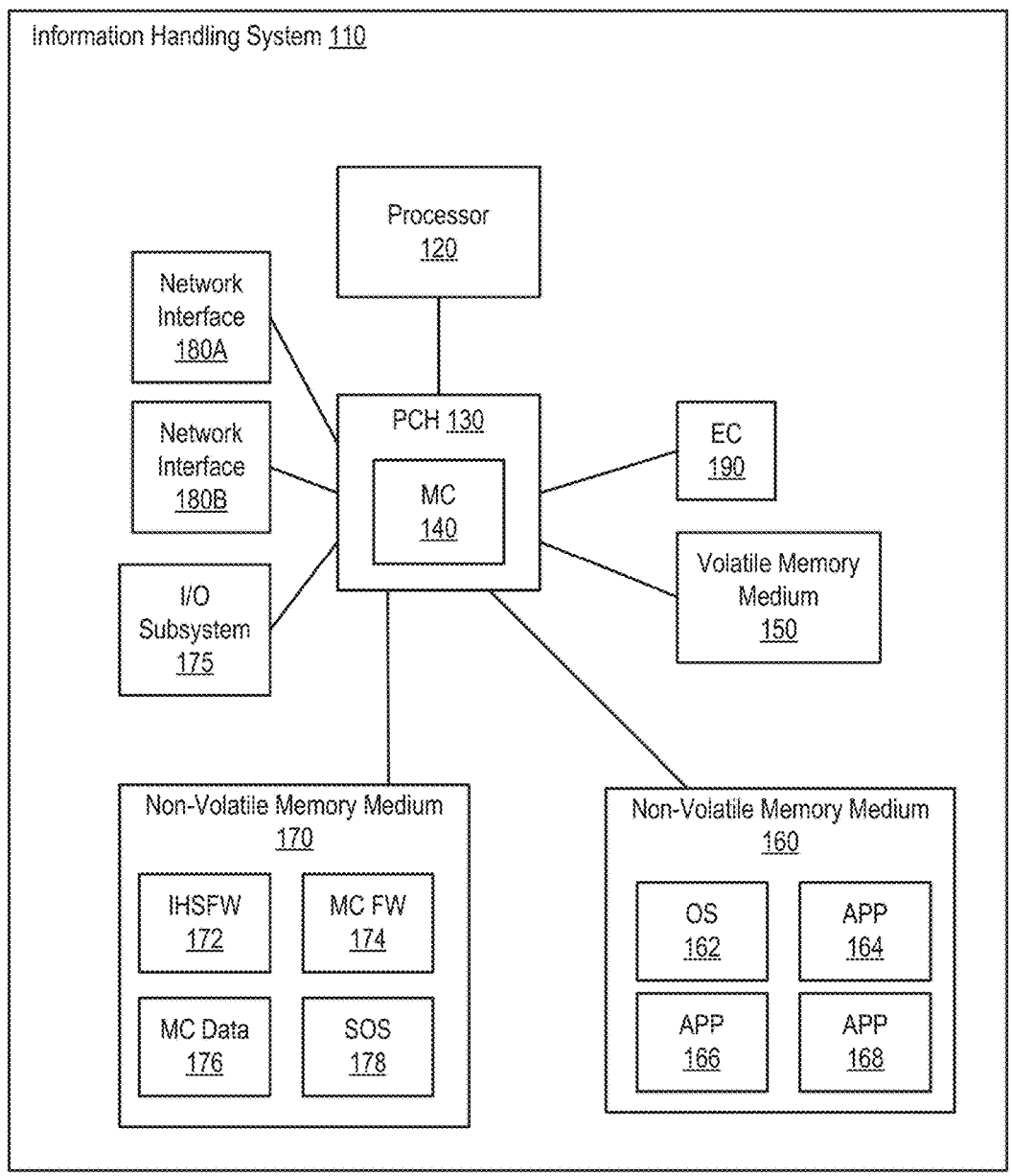
FIG. 1A illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, an out-of-band (OOB) system of an information handling system (IHS) may modify the IHS if the IHS compromised. In one example, the IHS may be lost. For instance, a user may have left the IHS somewhere. In another example, the IHS may be stolen. In another example, the IHS may be coupled to an unknown and/or untrusted network. In one or more embodiments, the OOB system modifying the IHS may include modifying credential information stored via the IHS. For example, modifying the credential information may disable and/or deny access to one or more portions of the IHS. In one or more embodiments, the OOB system modifying the IHS may include remapping one or more human interface devices. For example, the one or more human interface devices may include one or more of a keyboard, a pointing device, a display, a touch screen, and a power button. In one or more embodiments, remapping one or more human interface devices may hinder and/or prevent access of the IHS. For example, when one or more human interface devices are remapped, obtaining and/or extracting information from the IHS may be prevented or mitigated.

In one or more embodiments, modifying the IHS when the IHS is compromised may permit data of the IHS to be recovered when the IHS is no longer compromised. For example, data stored via a storage device (e.g., a hard drive, a solid state drive, etc.) may not be modified, and that data may be recovered when the IHS is no longer compromised. For instance, data of the storage device may be encrypted, and an encryption key may be modified or removed when the IHS is compromised and restored or stored when the IHS is no longer compromised. In one or more embodiments, one or more portions of the IHS are operational while other one or more portions of the IHS are not operational. For example, one or more of an embedded controller and a management controller, among others, of the IHS may be operational while one or more processors, among others, of the IHS are not operational. For instance, when the one or more processors of the IHS are not operational, the IHS may be considered powered off or sleeping, among others.

Turning now to FIG. 1A, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a platform controller hub (PCH) 130, a volatile memory medium 150, non-volatile memory media 160 and 170, an I/O subsystem 175, network interfaces 180A and 180B, and an embedded controller (EC) 190. As illustrated, processor 120, volatile memory medium 150, non-volatile memory media 160 and 170, I/O subsystem 175, network interfaces 180A and 180B, and EC 190 may be communicatively coupled to PCH 130. In one or more embodiments, PCH 130 may transfer information between or among two or more of processor 120, volatile memory medium 150, non-volatile memory media 160 and 170, I/O subsystem 175, and network interfaces 180A and 180B, among others not specifically illustrated.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAIVI (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In one instance, network interface 180A may be configured to be coupled to a wired network. In another instance, network interface 180A may be coupled to an optical network. In another example, network interface 180 may be coupled to a wireless network. For instance, network interface 180B may be configured to be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

As shown, non-volatile memory medium 160 may include an OS 162, and APPs 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may MC firmware (FW) 174, MC data 176, and a secure object store (SOS) 178. For example, MC FW 174 may include MC processor instructions that are executable by a MC processor of MC 140.

In one or more embodiments, one or more of MC 140 and EC 190 may be or include a microcontroller. In one example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP 430 microcontroller, an Argonaut RISC Core (ARC) embedded processor, an Andes core embedded processor, an AVR (e.g., 8-bit AVR, AVR-32, etc.) microcontroller, a PIC microcontroller, a 68HC11 microcontroller, a ColdFire microcontroller, and a Renesas microcontroller, among others. In another example, MC 140 may be or include an Intel® Management Engine (ME). For instance, MC FW 174 may include ME firmware that may be utilized by MC 140 in implementing Intel® Active Management Technology (AMT) functionality. In one or more embodiments, one or more of MC 140 and EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein. In one or more embodiments, one or more of MC 140 and EC 190 may be configured, coded, and/or encoded with instructions in accordance with one or more of systems, flowcharts, methods, and/or processes described herein and perform one or more functions and/or operations independently of processor 120.

Figure 1B:
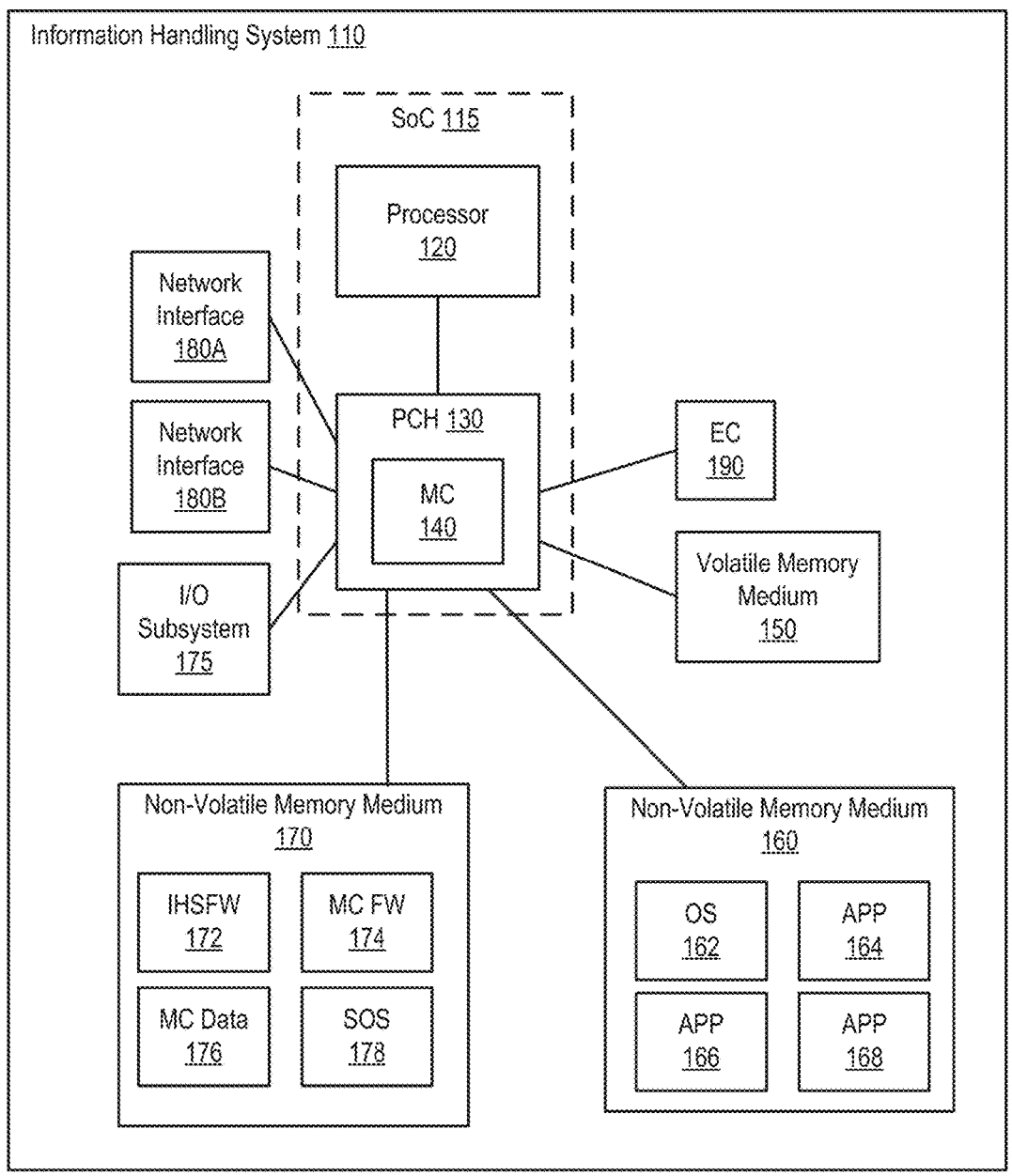
FIG. 1B illustrates an exemplary information handling system that is configured with a system-on-chip, according to one or more embodiments.

In one or more embodiments, processor 120 and PCH 130, among others, may be included in a system-on-chip (SoC). For example, as illustrated in FIG. 1B, a SoC 115 may include processor 120 and PCH 130.

Figure 2:
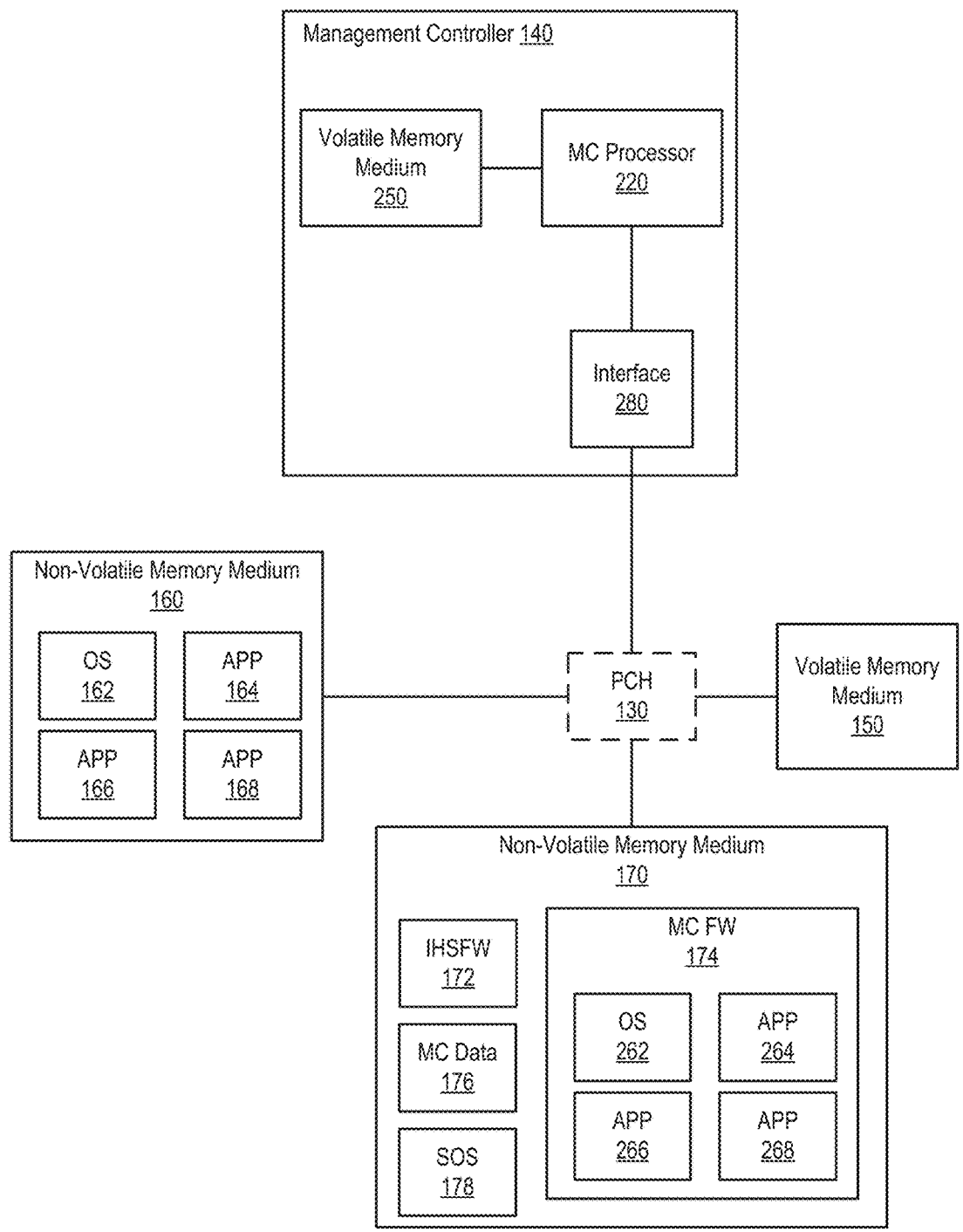
FIG. 2 illustrates an exemplary management controller, according to one or more embodiments.

Turning now to FIG. 2, an exemplary management controller is illustrated, according to one or more embodiments. As shown, MC 140 may include a MC processor 220, a volatile memory medium 250, and an interface 280. As illustrated, volatile memory medium 250 and interface 280 may be communicatively coupled to MC processor 220. In one or more embodiments, volatile memory medium 250 may include one or more structures and/or functionalities as those described with reference to volatile memory medium 150.

In one or more embodiments, MC processor 220 may be communicatively coupled to one or more of memory media 150, 160, and 170 via interface 280 and PCH 130. For example, MC processor 220 may access one or more of OS 162, APPs 164-168, IHSFW 172, MC FW 174, and MC data 176 via interface 280 and PCH 130.

As shown, MC FW 174 may include an OS 262 and APPs 264-268. For example, OS 262 may be or include a real-time operating system (RTOS). In one or more embodiments, one or more of OS 262 and APPs 264-268 may include processor instructions executable by MC processor 220. In one example, MC processor 220 may execute processor instructions of one or more of OS 262 and APPs 264-268 via non-volatile memory medium 170. In a second example, one or more portions of the processor instructions of the one or more of OS 262 and APPs 264-268 may be transferred to volatile memory medium 250, and MC processor 220 may execute the one or more portions of the processor instructions of the one or more of OS 262 and APPs 264-268 via volatile memory medium 250. In another example, one or more portions of the processor instructions of the one or more of OS 262 and APPs 264-268 may be transferred to volatile memory medium 150, and MC processor 220 may execute the one or more portions of the processor instructions of the one or more of OS 262 and APPs 264-268 via volatile memory medium 150.

In one or more embodiments, MC processor 220 may utilize MC data 176. In one example, MC processor 220 may utilize MC data 176 via non-volatile memory medium 170. In a second example, one or more portions of MC data 176 may be transferred to volatile memory medium 250, and MC processor 220 may utilize MC data 176 via volatile memory medium 250. In another example, one or more portions of MC data 176 may be transferred to volatile memory medium 150, and MC processor 220 may utilize MC data 176 via volatile memory medium 150.

In one or more embodiments, MC 140 may be utilized in implementing a system and/or service that may provide OOB management of IHS 110. In one example, an OOB system may include one or more of MC 140, MC FW 174, and MC data 176, among others. In a second example, IHS 110 may be managed remotely via MC 140, regardless of power applied to processor 120 and/or regardless of any functionality of OS 162. For instance, IHS 110 may be managed remotely via MC 140 when no power is applied to processor 120 and/or when OS 162 is not functioning or is not installed. In another example, an APP may be utilized to remotely setup, configure, monitor, maintain, upgrade, and/or repair multiple end points (e.g., computer systems that include one or more functionalities and/or one or more structures as those described with reference to IHS 110). For instance, the APP may be utilized to perform remotely perform enterprise setup, configuration, monitoring, maintenance, upgrades, and/or repairs. In one or more embodiments, processor 120 may be or include a main processor, and the 00B system may perform and/or executed one or more tasks independently from the main processor.

Figure 3:
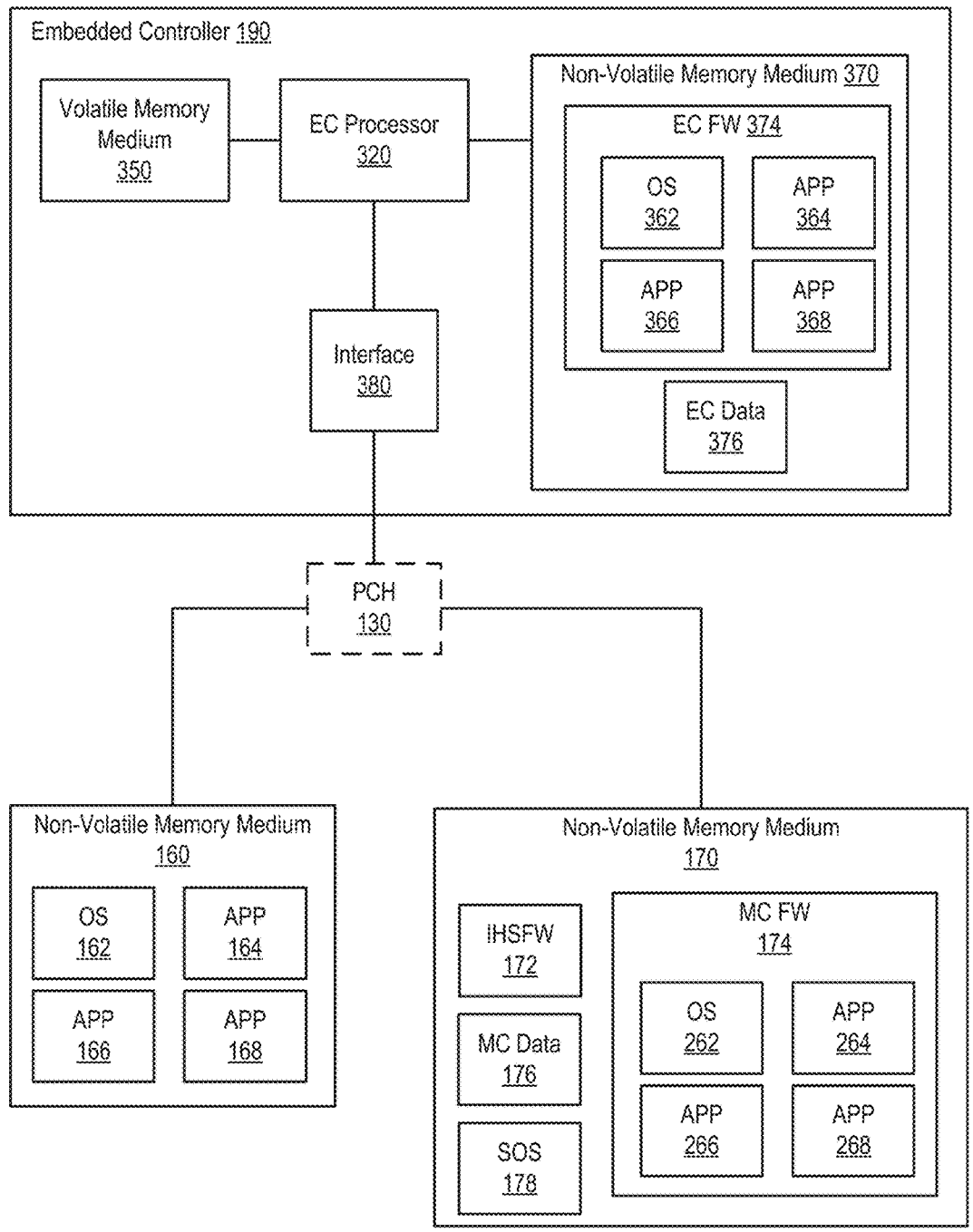
FIG. 3 illustrates an exemplary embedded controller, according to one or more embodiments.

Turning now to FIG. 3, an exemplary embedded controller is illustrated, according to one or more embodiments. As shown, EC 190 may include an EC processor 320, a volatile memory medium 350, a non-volatile memory medium 370, and an interface 380. In one or more embodiments, interface 380 may be coupled to PCH 130 via one or more of a LPC bus and an eSPI bus, among others. As illustrated, non-volatile memory medium 374 may include an EC FW 374, which may include an OS 362 and APPs 364-368, and may include EC data 376. For example, OS 362 may be or include a RTOS.

In one or more embodiments, one or more of OS 362 and APPs 364-368 may include processor instructions executable by EC processor 320. In one example, EC processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and EC processor 320 may execute the one or more portions of the processor instructions of the one or more of OS 362 and APPs 364-368 via volatile memory medium 350.

In one or more embodiments, EC processor 320 may utilize EC data 376. In one example, EC processor 320 may utilize EC data 376 via non-volatile memory medium 370. In another example, one or more portions of EC data 376 may be transferred to volatile memory medium 350, and EC processor 320 may utilize EC data 376 via volatile memory medium 350.

In one or more embodiments, EC 190 may be utilized in implementing a system and/or service that may be utilized in receiving, via an out-of-band system, credential management information and/or authentication information that may be utilized in modifying credential information of IHS 110 and/or may be utilized in modifying access of IHS 110. For instance, EC processor 320 may utilized interface 380, coupled to PCH 130, to access PCH 130, and EC processor 320 may execute instructions (e.g., OS 362, APPs 364-268, etc.) to modify credential information stored via SOS 178 and non-volatile memory medium 170.

Figure 4:
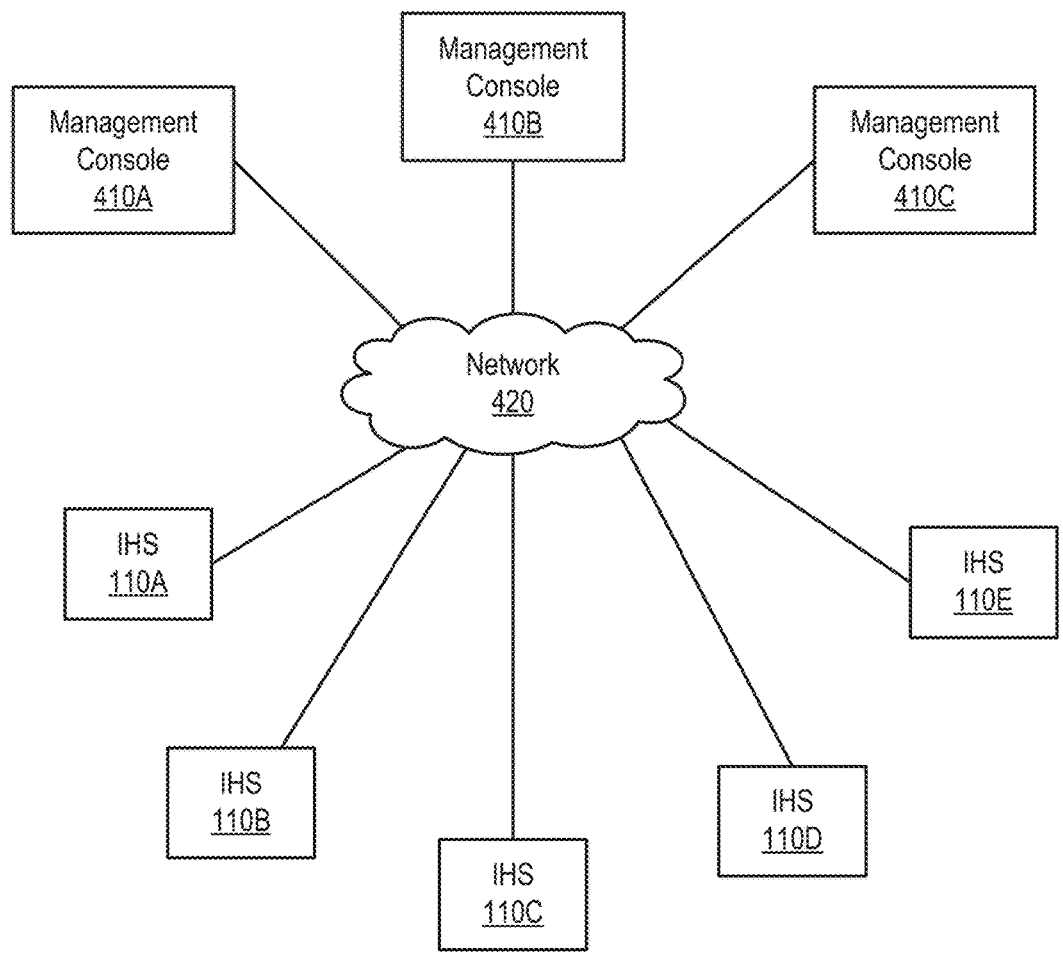
FIG. 4 illustrates an exemplary computing environment, according to one or more embodiments.

Turning now to FIG. 4, an exemplary computing environment is illustrated, according to one or more embodiments. As shown, IHSs 110A-110E and management consoles 410A-410C may be coupled to a network 420. In one or more embodiments, network 420 may include a wired network, a wireless network, an optical network, or a combination of the foregoing, among others. For example, network 420 may include and/or be coupled to various types of communications networks. For instance, network 420 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, each of one or more of management consoles 410A-410C may include one or more structures and/or functionalities as those described with reference to IHS 110.

In one or more embodiments, management console 410 may provide one or more of credential management information and authentication information, among others, to MC 140, MC 140 may provide the one or more of the credential management information and the authentication information to EC 190, and EC 190 may utilize the one or more of the credential management information and the authentication information in modifying credential information and/or in modifying access of IHS 110. For example, after the credential information is modified, access of one or more portions of IHS 110 may be denied.

In one or more embodiments, MC 140 may utilize a platform level data model (PLDM) write operation to write and/or provide one or more portions of the one or more of the credential management information and the authentication information to EC 190. For instance, MC 140 may utilize a multipart transfer to write and/or provide the one or more of the credential management information and the authentication information to EC 190. In one or more embodiments, a PLDM definition for transferring data from MC 140 to EC 190 is provided via Table 1 and Table 2.

TABLE 1

| Byte | Type | Request Data |
|------|------|--------------|
| 0 | enum8 | DeviceType<br>The Device type may indicate what device data is being transferred.<br>Possible values: {OpaqueData=0x1, etc.} |

TABLE 1-continued

| Byte | Type | Request Data |
|------|------|--------------|
| 1 | uint8 | DeviceID<br>DeviceID may be an identifier of a target of the CIM__OpaqueManagementData write command |
| 2 | enum8 | TransferOperationFlag<br>May indicates whether or not this is a request to write the next part of a multi-part transfer.<br>Possible values: {Start=0x01, Middle=0x02, End=0x04, StartAndEnd = 0x05, etc.} |
| 3:4 | uint16 | DataTransferHandle<br>This handle may be ignored by a responder when the TransferOperationFlag may be set to 1 (e.g., "Start") or 5 (e.g., "StartAndEnd"). This handle may have a value representing what block of data is being sent. |
| 5:63 | binary | Payload |

TABLE 2

| Byte | Type | Response Data |
|------|------|---------------|
| 0 | enum8 | CompletionCode<br>Possible values:<br>{PLDM__BASE__CODES,<br>INVALID__DATA__TRANSFER__HANDLE=0x80,<br>INVALID__TRANSFER__OPERATION__FLAG=0x81,<br>NO__DEVICE__DATA__AVAILABLE=0x83,<br>INVALID__DEVICE__TYPE=0x84, etc.} |
| 1:2 | uint16 | DataTransferHandle<br>A handle that may be utilized to identify and acknowledge a portion of a data transfer. |

Figure 5A:
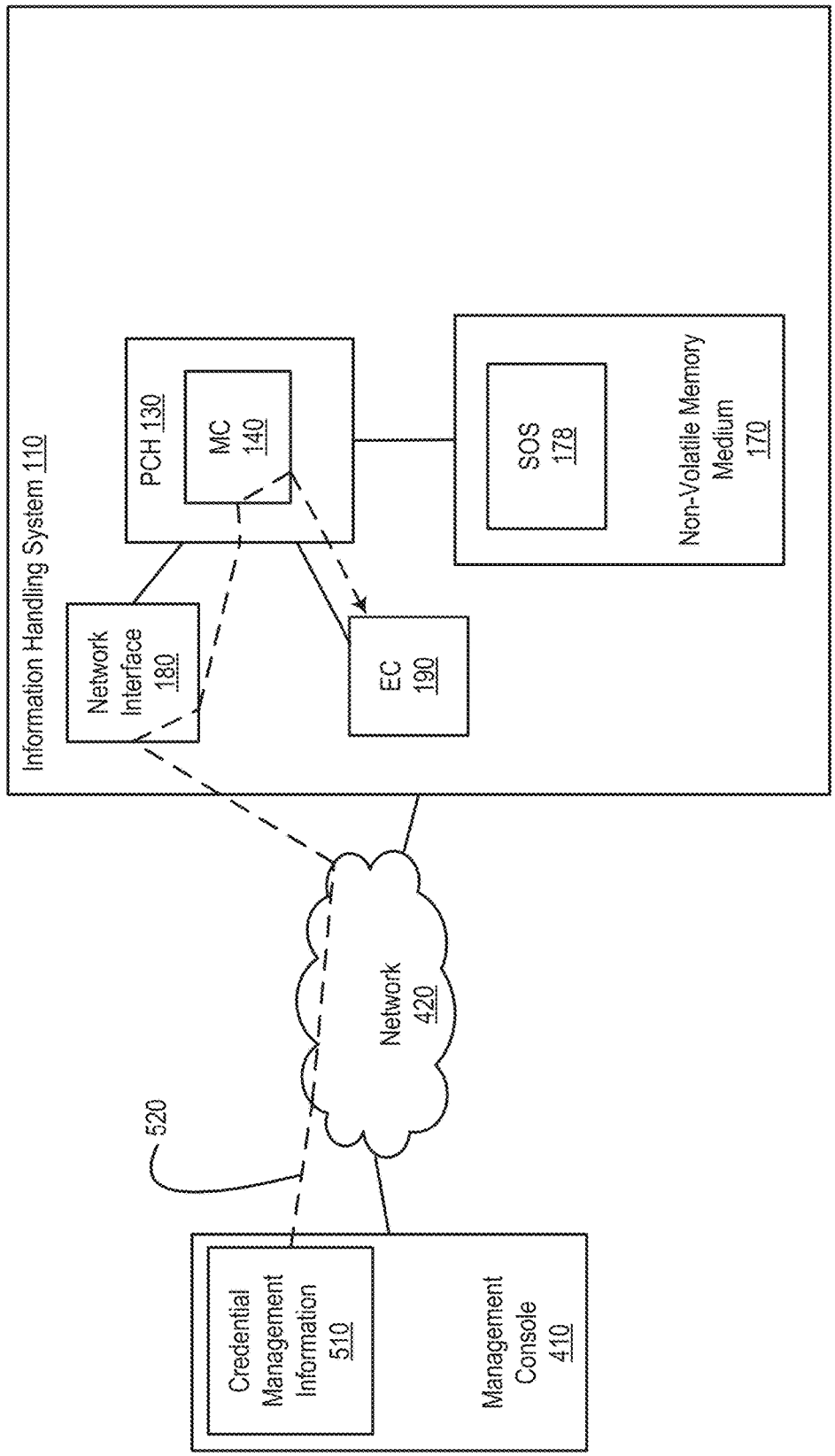
FIGS. 5A-5C illustrate exemplary block diagrams of providing and receiving information via an out-of-band system, according to one or more embodiments.
Figure 5B:
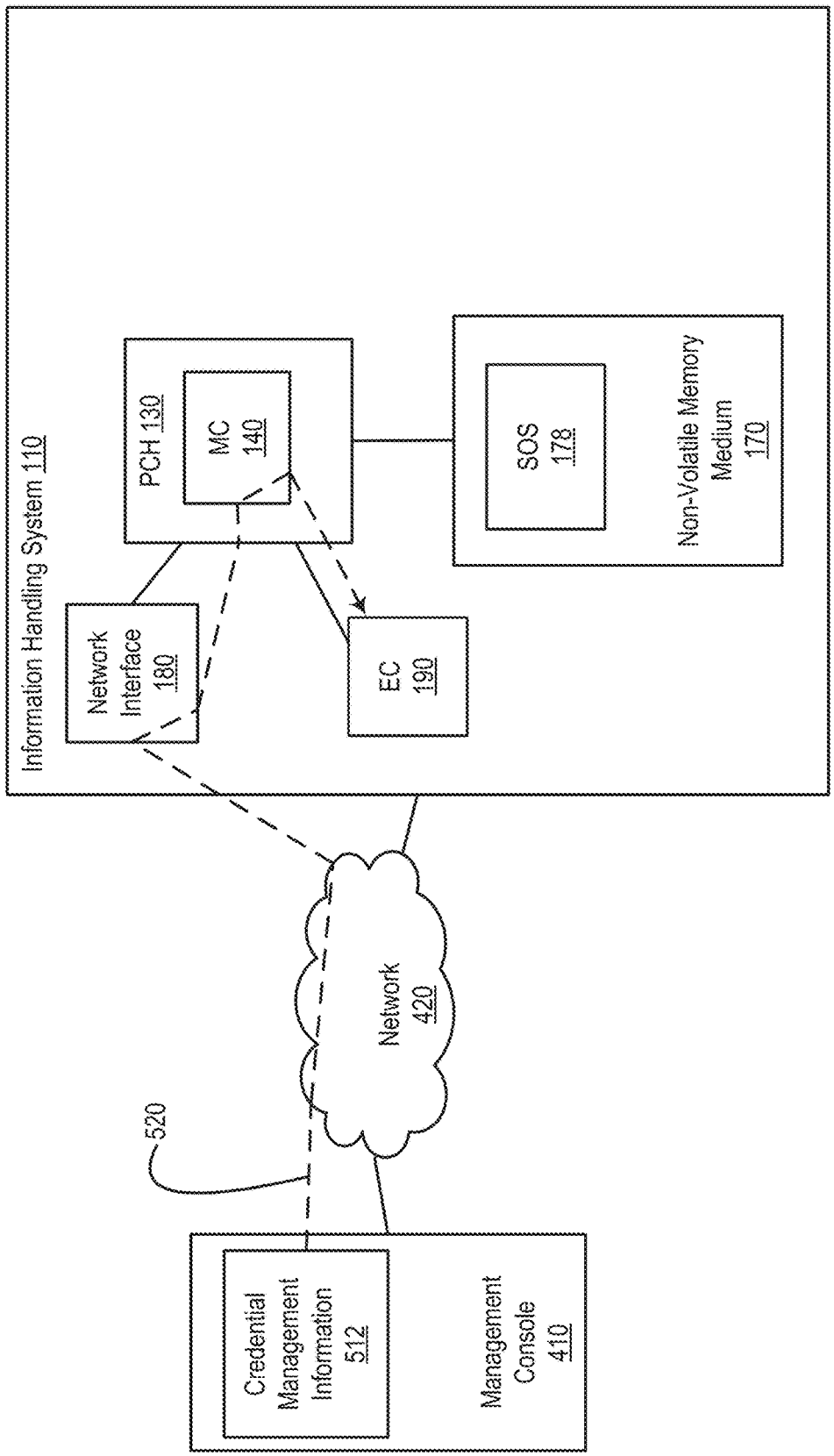
Figure 5C:
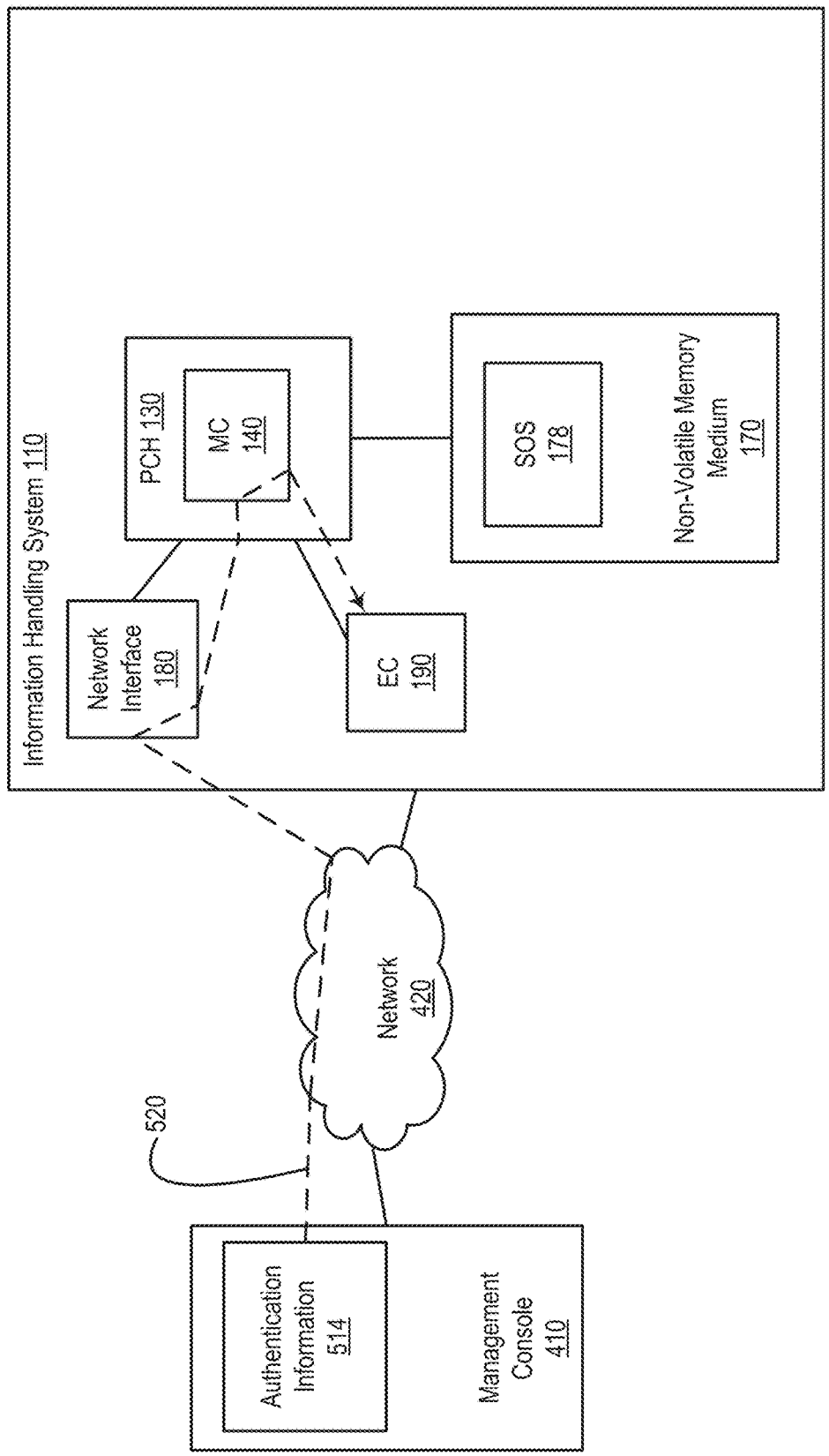

Turning now to FIGS. 5A-5C, exemplary block diagrams of providing and receiving information via an OOB system is illustrated, according to one or more embodiments. As shown in FIG. 5A, credential management information 510 may travel via a logical path 520; as illustrated in FIG. 5B, credential management information 512 may travel via logical path 520; and as shown in FIG. 5C, authentication information 514 may travel via logical path 520. For example, logical path 520 illustrates that management console 410 may provide, to IHS 110, one or more of credential management information 510, credential management information 512, and authentication information 514.

In one or more embodiments, MC 140 may receive one or more of credential management information 510, credential management information 512, and authentication information 514 from management console 410. In one example, MC 140 may receive one or more of credential management information 510, credential management information 512, and authentication information 514 management console 410 via one or more of network 420 and network interface 180. In another example, MC 140 may receive one or more of credential management information 510, credential management information 512, and authentication information 514 via a web-services management (WS-MAN) data transfer.

In one or more embodiments, EC 190 may receive one or more of credential management information 510, credential management information 512, and authentication information 514 via a multipart transfer operation. For example, MC 140 may utilize the multipart transfer operation in providing one or more of credential management information 510, credential management information 512, and authentication information 514 to EC 190. For instance, the multipart transfer operation may be or include a CIM OpaqueManagementData write command.

As demonstrated in FIGS. 5A-5C, one or more of processor 120 and OS 162, among others, may not be involved in IHS 110 receiving and storing one or more of credential management information 510, credential management information 512, and authentication information 514, according to one or more embodiments. For example, an OOB system may include one or more of MC 140 and EC 190, and the OOB system or one or more of elements of the OOB system may perform tasks independently from one or more of processor 120 and OS 162, among others.

In one or more embodiments, IHS 110 may be compromised. In one example, credential management information 510 (e.g., first credential management information) may be utilized in modifying credentials stored via SOS 178 such that an unauthorized user may not be able to access data or confidential data of IHS 110. In another example, credential management information 512 (e.g., second credential management information) may be utilized in modifying credentials stored via SOS 178 such that a user may access data or confidential data of IHS 110. For instance, credential management information 512 may be utilized in modifying credentials stored via SOS 178 such that IHS 110 is restored to normal operations. In another example, authentication information 514 may be utilized in a system, process, and/or method that restores IHS 110 to normal operations. For instance, authentication information 514 may be matched to information obtained via a different route (e.g., a keyboard, Bluetooth, etc.).

In one or more embodiments, one or more of credential management information 510, credential management information 512, and authentication information 514 may be provided to IHS 110 when IHS 110 is in a low-power mode and/or without user interaction. For example, the low-power mode may include a mode where processor 120 is in a low-power mode (e.g., a low-power state) and/or is not processing processor instructions. For instance, one or more of processor 120 and OS 162, among others, may not be involved in receiving one or more of credential management information 510, credential management information 512, and authentication information 514 and/or may not be utilized in modifying credential information of SOS 178.

Figure 6:
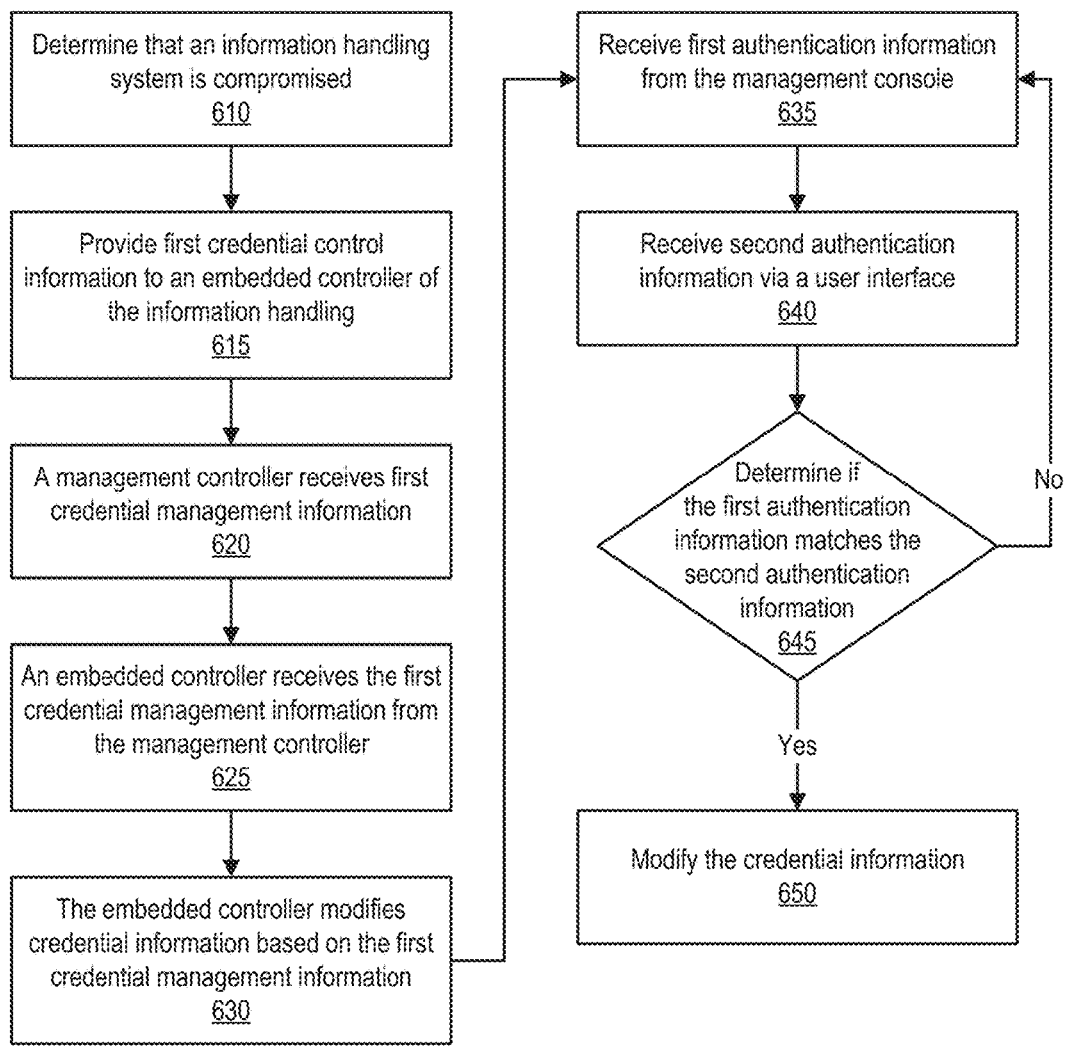
FIG. 6 illustrates a method of operating an information handling system, according to one or more embodiments.

Turning now to FIG. 6, a method of operating an information handling system is illustrated, according to one or more embodiments. At 610, it may be determined that an IHS is compromised. For example, management console 410 may determine that IHS 110 is compromised. In one or more embodiments, determining that the IHS is compromised may include IHS determining a change of network. For example, IHS 110 may have been accessing a first network and then, accesses a second network, different from the first network. In one instance, MC 140 may determine the change in network and provide information associated with the change in network to EC 190. In a third instance, at least one of OS 162 and APPs 164-168 may determine the change in network and provide information associated with the change in network to EC 190 via IHSFW 172. In another instance, EC 190 may determine the change in network.

In one or more embodiments, IHS 110 may provide information to management console 410 based on the change in network. For example, EC 190 may provide the information to management console 410 based on the change in network. For instance, EC 190 may provide the information based on the change in network to MC 140, which may provide the information based on the change in network to management console 410 via network interface 180. In one or more embodiments, determining that the IHS is compromised may include receiving information that indicates that the IHS is compromised. For example, the information that indicates that the IHS is compromised may include information that indicated that the IHS is lost or stolen, among others. For instance, management console 410 may provide the information that indicates that the IHS is compromised to the IHS.

At 615, first credential management information may be provided to an embedded controller. For example, management console 410 may provide the first credential management information (e.g., credential management information 510) to EC 190 of IHS 110. In one or more embodiments, the first credential management information may be utilized in disabling and/or denying access to one or more portions of IHS 110. At 620, a management controller may receive the first credential management information. For example, MC 140 may receive the first credential management information via network interface 180. At 625, the embedded controller may receive the first credential management information from the management controller. For example, EC 190 may receive the first credential management information from MC 140.

At 630, the embedded controller may modify credential information based on the first credential management information. For example, EC 190 may modify the credential information based on the first credential management information. For instance, SOS 178 may store the credential information, and EC 190 may access non-volatile memory medium 170 and SOS 178 and modify the credential information based on the first credential management information. In one or more embodiments, the credential information may include one or more of a password, biometric information associated with a user (e.g., a fingerprint, a retina pattern, a voice identification, etc. of the user), and an encryption key, among others. For example, EC 190 may modify one or more of the password, the biometric information, and the encryption key. In one instance, modifying the one or more of the password, the biometric information, and the encryption key may include changing at least a portion of the one or more of the password, the biometric information, and the encryption key. In another instance, modifying the one or more of the password, the biometric information, and the encryption key may include deleting and/or removing the one or more of the password, the biometric information, and the encryption key.

In one or more embodiments, EC 190 may manage encrypted objects stored via SOS 178. In one example, EC 190 may manage objects that were encrypted via another device. For instance, the other device may be or include processor 120, among others. In another example, EC 190 may encrypt and/or decrypt objects stored via SOS 178. In one or more embodiments, at least a portion of a memory medium of IHS 110 may be encrypted. For example, modifying the encryption key may render IHS 110 inoperable. For instance, rendering IHS 110 inoperable may include changing IHS 110 to a state where IHS 110 may not provide any secret and/or confidential information. In one or more embodiments, rendering IHS 110 inoperable may preserve data stored via a memory medium. For example, IHS 110 may be recovered, and the encryption key may be modified again (e.g., restored). For instance, if the encryption key is restored, the user may utilize IHS 110 in accessing the secret and/or confidential information.

At 635, first authentication information may be received. For example, EC 190 may receive the first authentication information (e.g., authentication information 514) from management console 410. For instance, EC 190 may receive the first authentication information from MC 140, which may receive the first authentication information from management console 410 via network interface 180. At 640, second authentication information may be received via a user interface. For example, EC 190 may receive the second authentication information via a user interface. In one or more embodiments, a user may receive the second authentication information and provide the second user code to the user interface. For example, the user may receive the second authentication information via one or more of an email, a simple messaging service (SMS) message, and a telephone, among others.

At 645, it may be determined if the first authentication information matches the second authentication information. For example EC 190 may determine if the first authentication information matches the second authentication information. If the first authentication information does not match the second authentication information, the method may proceed to 635. If the first authentication information matches the second authentication information, the credential information may be modified at 650. For example, EC 190 may modify the credential information. In one or more embodiments, modifying the credential information may include setting or resetting a password, storing or restoring an encryption key, and/or storing or restoring biometric information, among others. For example, EC 190 may request and/or receive second credential management information (e.g., credential management information 512) from management console 410. For instance, the second credential management information may be utilized in modifying the credential information such that access of IHS 110 is restored.

Figure 7:
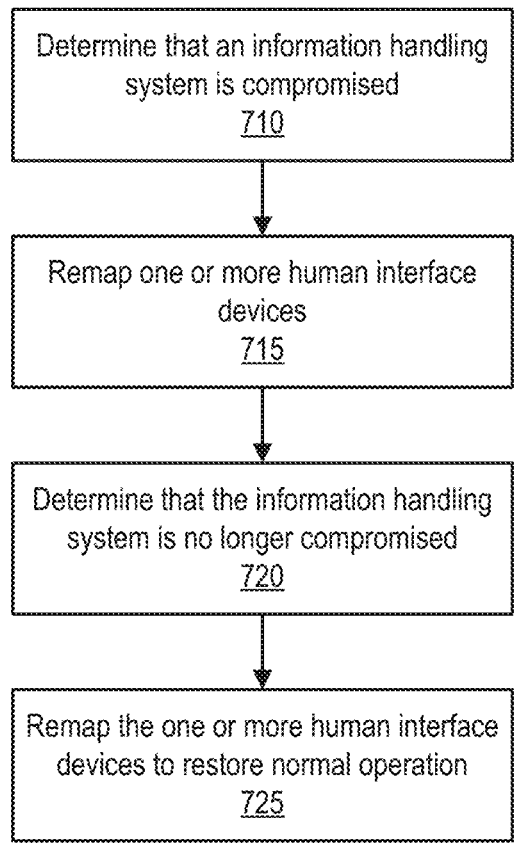
FIG. 7 illustrates another method of operating an information handling system, according to one or more embodiments.

Turning now to FIG. 7, another method of operating an information handling system is illustrated, according to one or more embodiments. At 710, it may be determined that an IHS is compromised. In one or more embodiments, determining that the IHS is compromised may include IHS determining a change of network. For example, IHS 110 may have been accessing a first network and then, accesses a second network, different from the first network. For instance, EC 190 may determine the change in network. In one or more embodiments, IHS 110 may provide information to management console 410 based on the change in network. For example, EC 190 may provide the information to management console 410 based on the change in network. For instance, EC 190 may provide the information based on the change in network to MC 140, which may provide the information based on the change in network to management console 410 via network interface 180. In one or more embodiments, determining that the IHS is compromised may include receiving information that indicates that the IHS is compromised. For example, the information that indicates that the IHS is compromised may include information that indicated that the IHS is lost or stolen, among others. In one instance, management console 410 may provide the information that indicates that the IHS is compromised to the IHS. In another instance, EC 190 may receive the information that indicates that the IHS is compromised.

At 715, one or more human interface devices may be remapped. For example, EC 190 may remap one or more human interface devices associated with IHS 110. In one or more embodiments, the one or more human interface devices may include one or more of a keyboard, a pointing device, a display, a touch screen, and a power button, among others. For example, the pointing device may include a mouse, a touchpad, a touch screen, a track ball, a joystick, or a light pen, among others. In one or more embodiments, a human interface device may be coupled to the IHS via a serial interface. For example, the serial interface may include a USB interface, among others. In one or more embodiments, remapping one or more human interface devices may hinder and/or prevent access of the IHS. For example, when one or more human interface devices are remapped, obtaining and/or extracting information from the IHS may be prevented or mitigated.

In one or more embodiments, remapping the one or more human interface devices may include changing one or more functionalities associated with the one or more human interface devices. In one example, the power button may be remapped such that the power button no longer functions to change a power state associated with the IHS. In another example, keys of a keyboard may be remapped to no longer function or to function differently than normal operations. For instance, keys "Q W E R T Y" may be remapped to "Y I K E R S". In one or more embodiments, keyboard keys may be continually remapped to prevent a pattern determination of a new keyboard mapping.

In one or more embodiments, other portions of the IHS may be remapped. In one example, a boot control may be remapped such that the IHS may not be booted by another memory medium (e.g., another hard drive, another solid state drive, a thumbdrive, a USB drive, etc.). In another example, I/O operations of one or more USB ports may be disabled.

At 720, it may be determined that the IHS is no longer compromised. In one or more embodiments, determining that the IHS is no longer compromised may include receiving information that indicates that the IHS is no longer compromised. For example, the information that indicates that the IHS is no longer compromised may include information that indicated that the IHS has been recovered, among others. For instance, management console 410 may provide, to the IHS, the information that indicates that the IHS has been recovered.

In one or more embodiments, determining that the IHS is no longer compromised may include receiving a first authentication information and a second authentication information and determining that the first authentication information matches the second authentication information. In one example, EC 190 may receive the first authentication information from MC 140, which may receive the first authentication information from management console 410 via network interface 180. In a second example, EC 190 may enable or reenable one or more human interface devices to receive the second authentication information. For instance, EC 190 may receive the second authentication information via the one or more human interface devices. In another example, I/O operations of one or more USB ports may be reenabled. In one or more embodiments, a user may receive the second authentication information and provide the second authentication code to the one or more human interface devices. For example, the user may receive the second authentication information via one or more of an email, a SMS message, and a telephone, among others.

At 725, the one or more human interface devices may be remapped to restore normal operation of the IHS. For example, EC 190 may remap the one or more human interface devices to restore normal operation of IHS 110.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a network interface;
a non-volatile memory medium configured to store a secure object store;
a management controller coupled to the network interface; and
an embedded controller coupled to the management controller and coupled to the non-volatile memory medium;
wherein the management controller receives, independently of a processor of the information handling system and via the network interface, first credential management information;
wherein the embedded controller:
receives, independently of the processor, the first credential management information from the management controller; and
modifies, independently of the processor and based on the first credential management information, credential information stored via the secure object store, wherein the credential information includes at least one of a password, biometric information associated with a user, and an encryption key, wherein, when the embedded controller modifies the credential information, the embedded controller disables the at least one of the password, the biometric information associated with the user, and the encryption key, which disables access of information stored by the information handling system;
wherein the management controller further receives, independently of the processor and via the network interface, second credential management information; and
wherein the embedded controller further:
receives, independently of the processor, the second credential management information from the management controller; and
enables, independently of the processor, the at least one of the password, the biometric information associated with the user, and the encryption key, which reenables access of the information stored by the information handling system.

2. The information handling system of claim 1,
wherein the management controller further:
determines, independently of the processor and via the network interface, a change of network; and
provides information associated with the change of network to the embedded controller;
wherein the embedded controller further:
provides, independently of the processor and via the management controller, information associated with the change of network to a management console; and
accesses the credential information; and
wherein when the embedded controller modifies, independently of the processor and based on the first credential management information, the credential information stored via the secure object store of the information handling system, the embedded controller modifies the credential information such that the information handling system denies access to at least a portion of the information handling system based on the credential information.

3. The information handling system of claim 1,
wherein the management controller further receives, independently of the processor and via the network interface, first authentication information;
wherein the information handling system receives second authentication information via a user interface of the information handling; and
wherein the embedded controller further:
determines that the first authentication information and the second authentication information match; and
in response to determining that the first authentication information and the second authentication information match, enables, independently of the processor, the at least one of the password, the biometric information associated with the user, and the encryption key.

4. The information handling system of claim 1, wherein the embedded controller further remaps, independently of the processor, at least one human interface device.

5. The information handling system of claim 4, wherein the at least one human interface device includes at least one of a keyboard, a pointing device, a display, a touch screen, and a power button.

6. The information handling system of claim 4, wherein the embedded controller further receives information that indicates that the information handling system is compromised.

7. A method of operating an information handling system, comprising:
a management controller receiving, independently of a processor of the information handling system and via a network interface of the information handling system, first credential management information;
an embedded controller receiving, independently of the processor, the first credential management information from the management controller;
the embedded controller modifying, independently of the processor and based on the first credential management information, credential information stored via a secure object store of the information handling system, wherein the credential information includes at least one of a password, biometric information associated with a user, and an encryption key, wherein the embedded controller modifying the credential information includes disabling the at least one of the password, the biometric information associated with the user, and the encryption key, which disables access of information stored by the information handling system;
the management controller receiving, independently of the processor and via the network interface, second credential management information;
the embedded controller receiving, independently of the processor, the second credential management information from the management controller; and
the embedded controller enabling, independently of the processor and based on the second credential management information, the at least one of the password, the biometric information associated with the user, and the encryption key, which reenables access of the information stored by the information handling system.

8. The method of claim 7, further comprising:
the management controller determining, independently of the processor and via the network interface, a change of network;
the embedded controller providing, independently of the processor and via the management controller, information associated with the change of network to a management console;
accessing the credential information; and
denying, based on the credential information, access of at least a portion of the information handling system.

9. The method of claim 7, further comprising:
the management controller receiving, independently of the processor and via the network interface, first authentication information;
receiving second authentication information via a user interface of the information handling;
determining that the first authentication information and the second authentication information match; and
in response to the determining that the first authentication information and the second authentication information match, the embedded controller enabling, independently of the processor, the at least one of the password, the biometric information associated with the user, and the encryption key.

10. The method of claim 7, further comprising:
determining that the information handling system is compromised; and
providing, via a network, the first credential management information, wherein the first credential management information is configured to disable at least a portion of the information handling system.

11. The method of claim 10, wherein the determining that the information handling system is compromised includes determining that the information handling system is coupled to an unauthorized network.

12. The method of claim 7, further comprising:
accessing the credential information; and
providing utilization of the information handling system based on the credential information.

13. The method of claim 7, further comprising:
the embedded controller remapping, independently of the processor, at least one human interface device.

14. The method of claim 13, wherein the at least one human interface device includes at least one of a keyboard, a pointing device, a display, a touch screen, and a power button.

15. The method of claim 13, further comprising:
determining, independently of the processor, that the information handling system is compromised;
wherein, in response to the determining, independently of the processor, that the information handling system is compromised, the embedded controller remapping, independently of the processor, the at least one human interface device.

* * * * *